United States Patent [19]

Yamamoto

[11] 4,340,287
[45] Jul. 20, 1982

[54] CAMERA SYSTEM USING STROBOSCOPE

[75] Inventor: Hiroshi Yamamoto, Yokohama, Japan

[73] Assignee: Canon Kabushiki Kaisha, Tokyo, Japan

[21] Appl. No.: 187,741

[22] Filed: Sep. 16, 1980

[30] Foreign Application Priority Data

Sep. 18, 1979 [JP] Japan .................. 54-119636

[51] Int. Cl.³ .................................. G03B 15/05
[52] U.S. Cl. ......................... 354/128; 354/152; 354/154
[58] Field of Search ............... 354/126–128, 354/145, 152, 154, 155, 219, 224, 225; 362/5

[56] References Cited

U.S. PATENT DOCUMENTS

| | | | |
|---|---|---|---|
| 3,416,422 | 12/1968 | Dietrich et al. | 354/128 |
| 3,613,543 | 10/1971 | Mita et al. | 354/154 |
| 3,971,050 | 7/1976 | Okuno et al. | 354/128 |
| 3,978,502 | 8/1976 | Okuno et al. | 354/225 |
| 4,001,640 | 1/1977 | Biber | 354/145 X |
| 4,035,817 | 7/1977 | Iida et al. | 354/219 |

*Primary Examiner*—John Gonzales
*Attorney, Agent, or Firm*—Toren, McGeady & Stanger

[57] ABSTRACT

A camera system rendering it possible to display stroboscopic information (for example, flash light information, electrical energy storage finish information and computer information) of a stroboscope in the interior of the finder of a single lens reflex camera. One of the features of the present invention is that the stroboscopic unit is provided with a stroboscopic information exit window in one side surface of the casing thereof, and the pentaprism housing of the camera is provided with a stroboscopic information entrance window in the opposite side surface thereof in alignment with the exit window so that the stroboscopic information is routed into the finder. Another feature is to provide a blind for light-shielding the entrance window so that when the stroboscopic unit is not in use and the entrance window is shut, the finder optical system is protected from the influence of ambient light in the daylight exposure mode.

8 Claims, 3 Drawing Figures

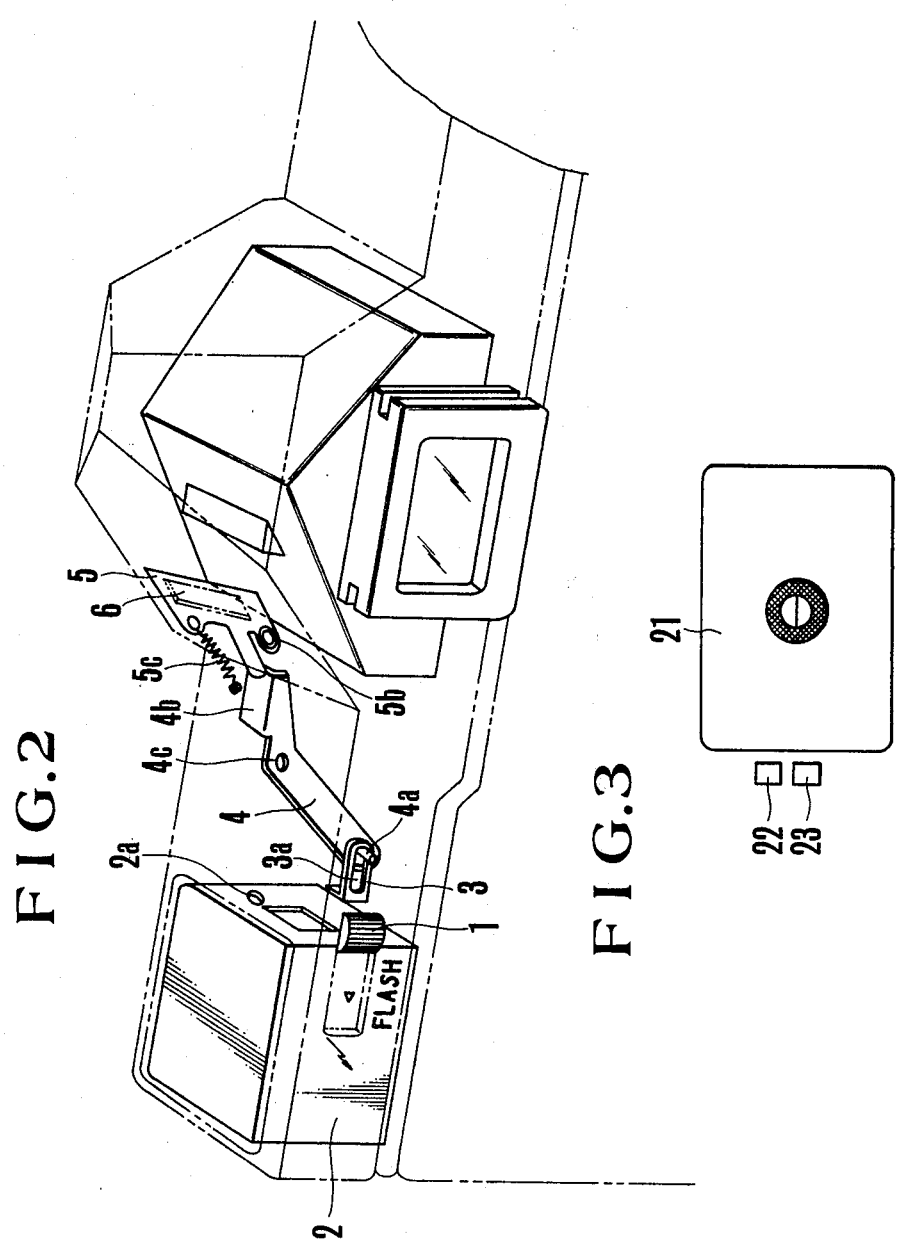

CAMERA SYSTEM USING STROBOSCOPE

BACKGROUND OF THE INVENTION

1. Field of the Invention

This invention relates to a strobo built-in camera, and more particularly to an information display device for a strobo built-in single lens reflex camera.

2. Description of the Prior Art

Recently in lens shutter cameras, because of their convenient portability, the built-in form of the strobo has found general use.

Due to their tendency, there is a demand for incorporating a strobo in a single lens reflex camera as well as in a lens shutter camera.

However, in a case where the strobo is incorporated in the single lens reflex camera, the finder optical system of the camera and the stroboscopic lamp have to be spaced a substantial distance such that the presentation of the display of stroboscopic information such as electrical energy storage finish information, firing assessment information, etc. considered indispensable for flash photography in the field of view of the finder is complicated and very troublesome.

SUMMARY OF THE INVENTION

An object of the present invention is to solve the above-described problems and to provide an information display device capable of readily presenting a display of strobo information in the field of view of the finder.

Another object of the present invention is to provide a camera system in which the strobo unit is provided with a strobo information-bearing light exit window formed in a portion of the side panels of the casing thereof which faces the pentaprism housing, and the penta prism housing is provided with a strobo information-bearing light entrance opening formed in a portion of the opposite side panel thereof and aligned to the exit window when the strobo is in use, so that the strobo information bearing light is routed into the finder, and in which the above-described opening is provided with a blind means arranged to cooperate with the strobo unit in such a manner that when the strobo is not in use, the opening is shielded from ambient light.

These and other objects and features of the present invention will become apparent from the following detailed description of an embodiment thereof taken in conjunction with the accompanying drawings.

BRIEF DESCRIPTION OF THE DRAWINGS

FIG. 2 is a similar view of the camera of FIG. 1 when in daylight mode.

FIG. 3 is a plan view showing the field of view of the camera finder.

DESCRIPTION OF THE PREFERRED EMBODIMENT

Figure 1:
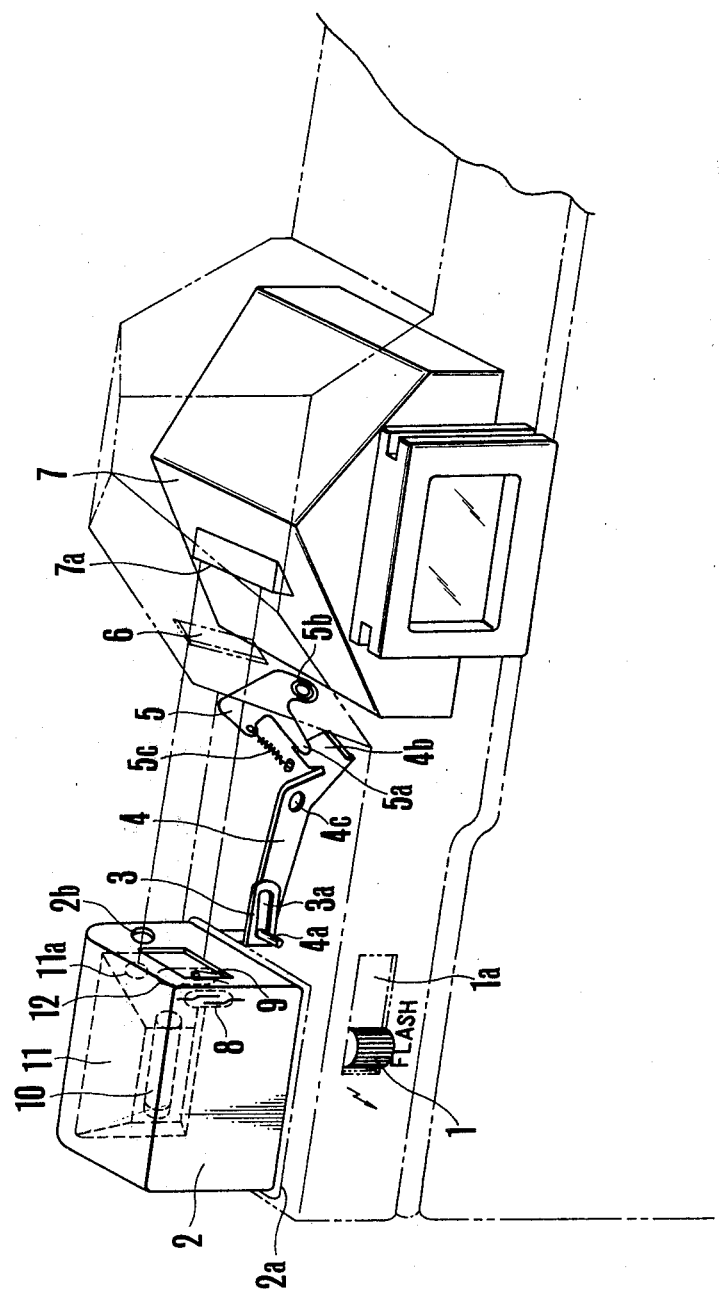
FIG. 1 is a fragmentary perspective view of a strobo built-in single lens reflex camera of the present invention when in flash mode.

The present invention is described in connection with an embodiment thereof in greater detail by reference to the drawings.

FIG. 1 is a perspective view of the main parts of an information display device for a strobo built-in single lens reflex camera according to the present invention. In this figure, the device is assumed to be set in flash mode.

In FIG. 1, 1 is a flash mode selector knob provided on the rear panel of the upper cover of the camera housing and slidingly movably guided in an elongated slot 1a. This knob 1 when moved to the left closes a normally open type battery switch (not shown). A computer strobo in a casing 2 is freely fitted in a receptor 2a formed in a portion of the camera housing and is biased by a spring (not shown) to move upward to the illustrated position of FIG. 1 when the knob 1 is moved to the left. The casing 2 is provided with an extension 3 having an elongated slot 3a through which an actuator pin 4a penetrates. There is further provided a first window 2b through which a portion of the flash light from a discharge tube emanates and a second window 9 through which light from a neon tube for electrical energy storage finish display is transmitted, both formed in the right side panel of the casing 2, as the strobo casing is positioned on the film rewind lever side, or on the opposite side of the pentaprism to that on which a shutter release button is located, as shown in FIGS. 1 and 2. A lever 4 is pivotally mounted on an axle 4c, and fixedly carries the actuator pin 4a at one end thereof, the opposite end of which is provided with a bent-off portion 4b. A blind 5 is urged by a spring 5c to turn in a counterclockwise direction so that one end 5a of the blind 5 normally abuts on the bent-off portion 4b of the lever 4. For this reason, when in the flash mode of FIG. 1, the blind 5 assumes an unblocking position wherein the strobo information bearing light from the firing window 2b and display window 9 is transmitted to an information entrance window. When in the daylight mode, the blind 5 assumes a blocking position where the strobo information-bearing light and unnecessary ambient light are shut out. 5b is a pivotal shaft of the blind 5. The upper cover of the camera housing is provided with an information entrance window 6 which is treated for dust proofing and which is aligned with the firing and display windows 2b and 9 as shown in FIG. 1. 7 is a pentaprism of known construction having an information receiving member 7a positioned on that one of the roof surfaces thereof which faces the window 6. A neon tube 8 is mounted in the interior of the strobo casing 2 and is arranged to be turned on when a known storage capacitor is charged to a predetermined voltage level. The neon tube 8 is positioned just behind the display window 9. The above-described known discharge tube 10 is fixedly mounted in the inside of a reflector 11 at the illustrated position. In the above-described computer strobo, when a firing stop signal for the discharge tube 10 is given off, an indicator lamp 12 is turned on. Since the electrical circuit of the computer strobo including the discharge tube 10, neon tube 8 and so on is known in the art, a more detailed explanation is omitted.

The operation of the strobo built-in single lens reflex camera of this construction is described below by reference to FIGS. 1 to 3. First an explanation will be given of the flash mode.

When the flash mode selector knob 1 is moved to a position labelled "FLASH", a latching member (not shown) is disengaged from the strobo casing 2, and then the strobo casing 2 is lifted upward from the initial position of FIG. 2 to the operative position of FIG. 1, while simultaneously moving the extension 3. This causes the lever 4 to be turned about the pivot axle 4c in a clockwise direction by the actuator pin 4a-and-slot 3a connection, whereby the blind 5 is retracted from the light blocking to the unblocking position.

On the other hand, such leftward movement of the flash mode selector knob 1 causes closure of the strobo power source switch (not shown) and the start of charging of the storage capacitor (not shown). Then, when the voltage on the main capacitor reaches a predetermined value, the neon tube 8 is turned on indicating that a full storage of electrical energy on the capacitor is completed. Light radiated from the neon tube 8 and bearing strobo information goes out through the display window 9 and is directed to the information entrance window 6 and information receiving member 7a by which the information is displayed in the finder at a position 22 in FIG. 3. It is noted that in photographic situations requiring the use of flash illumination, as the brightness level of ambient light is low, there is almost no possibility of encountering difficulty in reading the strobo information due to ambient light entering through the window 6 to the display area 22.

Then, when the shutter release button is depressed, adjustment of the diaphragm is followed by opening of the shutter, and the discharge tube 10 is fired to illuminate an object being photographed. A portion of the flash light emitted from the discharge tube 10 is directed through the opening 11a, window 2b, information entrance window 6 to the information receiving member 7a by which the firing-reckoned information is displayed in the finder.

Further the reflected light from the object with flash illumination is integrated on a photosensitive element (not shown) constituting part of an integrator of known construction. When the integrated amount of light reaches a predetermined value, a comparator circuit (not shown) produces a deactuating signal. Responsive to this signal, the discharge tube 10 is stopped from further firing. On the other hand, at the same time when the above-described firing stop signal is produced, the computer lamp 12 is turned on and light from the lamp 12 is directed through the exit window 9, the entrance window and the information receiving member 7a to the finder, whereby the computer information is displayed in the vicinity of the field of view of the finder at an area 23 (see FIG. 3). Also the flash exposure is terminated.

After the flash exposure has been completed, the strobo casing 2 may be pushed down by an operator's hand to the position of FIG. 2. When the strobo is mounted correctly in the receptor 2a, a flash mode selector knob 1 is automatically moved to the right until a position for daylight mode as shown in FIG. 2 is achieved, and the extension 3 also assumes again the initial position of FIG. 2. When this extension 3 is returned to the initial position, as the actuator pin 4a is guided to the right by the slot 3a, the lever 4 is turned about the axle 4c in the counterclockwise direction, while driving the blind 5 to move to the light blocking position by the bent-off portion of the lever 4.

After that, when an exposure is to be made in daylight mode, a normal operation may be performed. In this case, no strobo information is given off, and no display of the strobo information is presented in the finder. Further since the information entrance window 6 is light-shielded by the blind 6, the display areas 22 and 23 both are darkened and nothing is displayed.

As has been described above, according to the present invention, strobo informations such as electrical energy storage finish information, firing confirm information and computer confirm information will despite interruption of the finder optical path by the mirror, be displayed within the finder by simple means, thus contributing to realization of a strobo built-in single lens reflex camera. Moreover, since the strobo unit including the discharge tube lies on the side opposite to that on which the release button lies, or the film rewinding side, the strobo information bearing light path is not blocked accidentally by the operator's hand during the exposure operation particularly at the time of presentation of the display of the strobo information, thus giving rise to an advantage in that an always reliable presentation of the display of strobo information within the finder can be assured.

While a specific embodiment of the invention has been shown and described in detail to illustrate the application of the inventive principles, it will be understood that the invention may be embodied otherwise without departing from such principles.

What is claimed is:

1. A single lens reflex camera including:
   (a) a strobo unit, said unit when not in use assuming a first position relative to a camera body, and when in use assuming a second position, said unit including a discharge tube in a casing and being provided with a window formed in a portion of that of the side panels of said casing which faces a pentaprism housing of said camera through which window said strobo unit projects strobo information bearing light;
   (b) a pentaprism provided with a strobo information entrance opening in the opposite side surface to said strobo unit, said entrance opening being located in alignment to said window so that the strobo information bearing light from said window is directed through said entrance opening to the interior of said pentaprism; and
   (c) blind means cooperating with said strobo unit, said means light-shielding said entrance opening when said strobo unit lies in the first position, and releasing the light shield when in the second position.

2. A single lens reflex camera including:
   (a) a strobo unit, said unit moving to a first position relative to a camera body when not in use, and to a second position when in use, and said unit having a case portion provided with an information bearing light exit portion from which a strobo information bearing light emanates;
   (b) a pentaprism, said pentaprism being provided with an entrance opening portion for taking in said strobo information bearing light in the opposite surface to said strobo unit, and said opening portion being arranged at an opposite position to the position of said information bearing light exit portion which is taken when said strobo unit is in the second position; and
   (c) blind means cooperating with said strobo unit, said means light-shielding said entrance opening when said strobo unit lies in the first position and releasing the light shield when in the second position.

3. A single lens reflex camera according to claim 1 or 2, wherein said strobo unit is provided on the opposite side of said pentaprism to that on which a release actuating member of the camera body lies.

4. A single lens reflex camera according to claim 1, wherein said strobo information bearing light is a firing light beam of a discharge tube which is given off through a window portion.

5. A single lens reflex camera according to claim 1 or 4, wherein said strobo unit includes electrical energy storage finish light-emitting display means, a light beam from said means being given off as the strobo information bearing light through a window portion.

6. A single lens reflex camera according to claim 1 or 4, wherein said strobo unit includes light emitting means for light amount adjusting operation confirmation, a light beam from said means being given off as the strobo information bearing light through a window portion.

7. A single lens reflex camera including:
(a) a strobo unit, said unit moving to a first position relative to a camera body when not in use, and to a second position when in use, and said unit having an information bearing light emitting means from which a strobo information bearing light emanates;
(b) a pentaprism, said pentaprism being provided with an entrance portion for taking in said strobo information bearing light in the opposite surface to said strobo unit, and said entrance portion being arranged at an opposite position to the position of said information bearing light emitting means which is taken when said strobo unit is in the second position; and
(c) blind means cooperating with said strobo unit, said means light-shielding said entrance portion when said strobo unit lies in the first position and releasing the light shield when in the second position.

8. A single lens reflex camera usable with a strobo unit having strobo information bearing light emitting means in a side surface thereof, including:
(a) a pentaprism, said pentaprism being provided with a strobo information bearing light entrance portion in a side surface thereof; and
(b) shielding means, which light-shields the light entrance portion when the strobo unit is placed at the first position and is not in usable condition, and releases the light shielding of the light entrance portion when the strobo unit is placed at the second condition and is in use.

* * * * *